United States Patent

George et al.

[15] 3,695,767

[45] Oct. 3, 1972

[54] APPARATUS FOR MEASURING MAGNETIC HEAD ANGLE OF A MAGNETIC DISC FILE

[72] Inventors: David J. George, Westlake Village; Wilfred D. Iwan, Sierra Madre, both of Calif.

[73] Assignee: Burroughs Corporation, Detroit, Mich.

[22] Filed: Nov. 18, 1970

[21] Appl. No.: 90,702

[52] U.S. Cl. ..........356/154, 179/100.2 CA, 356/138

[51] Int. Cl. ..........G01b 11/26, G11b 5/00

[58] Field of Search ..........356/138, 150, 154; 179/100.2 CA

[56] References Cited

UNITED STATES PATENTS

| | | | |
|---|---|---|---|
| 2,232,177 | 2/1941 | Ide | 356/138 |
| 3,039,102 | 6/1962 | Fuller et al. | 179/100.2 CA X |
| 2,347,702 | 5/1944 | Maris | 356/154 |
| 3,552,859 | 1/1971 | Snyder | 356/138 X |
| 3,583,815 | 6/1971 | Kersey, Jr. | 356/150 |

OTHER PUBLICATIONS

Everett, " Technique for Aligning Laser Mirrors Using Gas Laser" Rev. Sci. Inst., Nov., 1965, pg. 375.

*Primary Examiner*—Ronald L. Wibert
*Assistant Examiner*—V. P. McGraw
*Attorney*—Christie, Parker & Hale

[57] ABSTRACT

There is described apparatus for measuring the flying angle of a pneumatically supported magnetic head relative to a recording disc in which a laser beam is directed toward a transparent rotating disc. The beam is split by the rotating disc into a reflected beam and an incident beam which falls on an adjacent surface of the recording head associated with the disc. A second reflected beam is formed by the recording head. By measuring the distance between the two reflected beams on a screen, the angle between the disc and the magnetic head can be determined.

5 Claims, 2 Drawing Figures

INVENTORS.
DAVID J. GEORGE
WILFRED D. IWAN
BY
Christie, Parker & Hale
ATTORNEYS

APPARATUS FOR MEASURING MAGNETIC HEAD ANGLE OF A MAGNETIC DISC FILE

FIELD OF THE INVENTION

This invention relates to optical measurements of small angles between two planar surfaces and, more particularly, is concerned with the measurement of the flying angle between a magnetic head and a magnetic recording disc of a disc file.

BACKGROUND OF THE INVENTION

Bulk storage devices for digital information have been developed in which the information is stored on the magnetized surface of a rotating disc. One or more magnetic transducer heads record and play back digital information on the disc. In order not to damage the surface of the magnetic disc, it is necessary that there be no actual contact between the moving surface of the disc and the stationary surface of the associated magnetic head. Yet to obtain high recording density of digital information and to provide a good signal-to-noise ratio in the recording and playback process, the spacing between the transducer head and the magnetic surface of the disc must be maintained as small as possible and held within extremely close tolerances.

Magnetic recording disc files of this type have been developed in which the magnetic heads are urged toward the surface of the disc but are prevented from coming into actual contact with the disc by a cushion of air formed dynamically between the relative moving surfaces of the disc and the head. Once this air cushion or bearing is formed between the surface of the rotating disc and the surface of the magnetic head, a rather large force is required to push the head into the required close proximity to the magnetic disc. Because such a large force is required, any abnormal condition which adversely affects the buildup of air pressure between the adjacent surface may result in the head "crashing" into the surface of the disc with destructive consequences.

In order to analyze, design, and control such magnetic disc recording arrangements and prevent such "crash" occurrences, it is necessary to measure with extreme accuracy the pitch and roll angles of the magnetic head relative to the disc as the disc rotates at high speed. These angles may be very small, of the order of 1 minute of arc or less. Various techniques have been developed to make effective measurements which do not interfere with the flying action of the magnetic heads relative to the disc. For example, capacitance probes have been positioned on various parts of the head to measure variations in the spacing between the parts of the head and the surface of the disc. Such capacitance probes are difficult to calibrate and unreliable because of variation in the dielectric strength due to contaminants in the gap. It has also been proposed to use the optical interference pattern set up by the two closely-spaced surfaces of the head and disc to measure the degree to which the two surfaces are out of parallel. Such an arrangement has proved very difficult to put into practice because of the poor contrast obtained with all but very high-power light sources, and the attendant difficulty in measuring and interpreting the results.

SUMMARY OF THE INVENTION

The present invention provides a highly effective technique using a low power inexpensive laser light source for generating an incident beam which is directed toward the surface of the disc from the opposite side on which the magnetic head is located. The laser beam is directed at a slight angle to the normal so that a reflected beam is formed by the surface of the disc which is directed away from the laser source. A portion of the incident beam passes through the transparent or partially transparent disc and is incident on the adjacent surface of the magnetic head. Because of the slight difference in angle between the surface of the disc and the surface of the head, the two reflected beams have a slightly different angle relative to each other which is a direct measurement of the angle between the reflecting surfaces. A calibrated screen intercepting the laser beam at a known distance from the reflecting surfaces provides a direct measure of the angle in terms of the linear separation of the two beams at the point of interception with the screen.

BRIEF DESCRIPTION OF THE DRAWINGS

For a more complete understanding of the invention, reference should be made to the accompanying drawing wherein.

DETAILED DESCRIPTION

Figure 1:
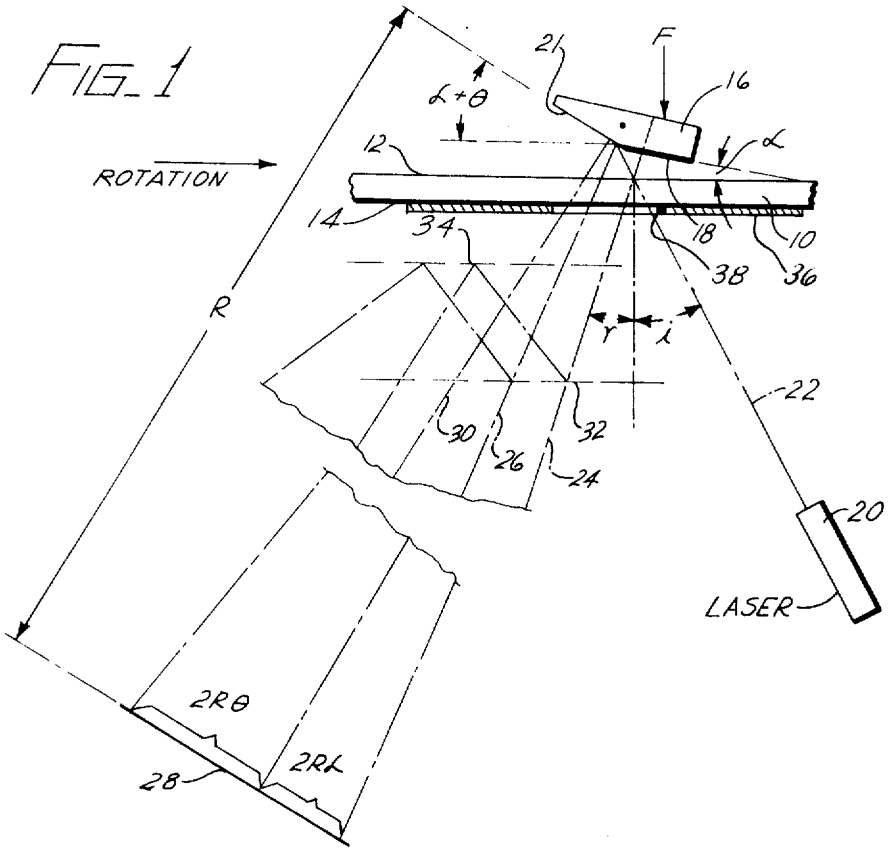
FIG. 1 is a diagrammatic showing of one embodiment of the invention.

Referring to FIG. 1 in detail, the numeral 10 indicates generally a portion of a thin circular disc made of glass or other suitable transparent material. Normally the disc is mounted for rotation about an axis perpendicular to the two parallel surfaces 12 and 14. Rotation of the disc causes the surfaces to move in a direction indicated by the arrow. Mounted adjacent the upper surface 12 of the disc 10, in a manner described in more detail in U.S. Pat. No. 3,310,792, is a "flying" magnetic head indicated generally at 16. The flying head is mounted in a gimbal arrangement (not shown) and is moved towards the disc by a force F. The magnetic head has a lower planar surface 18 and a leading planar surface 21 which has a higher angle of attack relative to the plane of the moving disc.

In normal operation, as described in the above-identified patent, the magnetic head under the action of the force F reaches a condition of equilibrium relative to the surface of the disc by virtue of an increase in air pressure which builds up between the surfaces of the magnetic head and the surface of the disc. The angle of the surface 18 relative to the surface 12 of the disc, indicated as the angle $\alpha$, is referred to as the flying angle. It should be noted that the flying angle, as well as the distance between the magnetic head and the disc, is greatly exaggerated in the drawing of FIG. 1. The flying angle typically is a fraction of a degree while the spacing may be of the order of 100 microinches.

Figure 2:
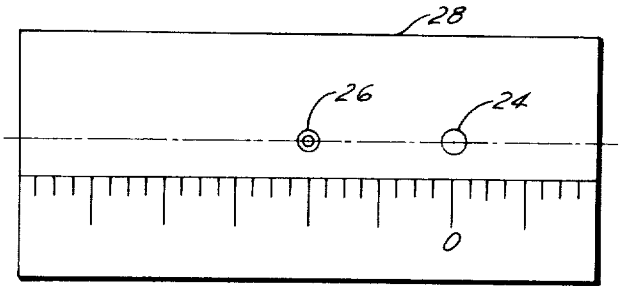
FIG. 2 illustrates the angle information projected on the screen.

Measurement of the angle $\alpha$ is made, according to the teaching of the present invention, by means of a beam from a low-powered laser source 20. The laser source 20 directs a highly collimated incident beam along a path 22. The incident beam passes through the disc 10 and there the light is split by partial reflection of the light off the surface 12 of the disc. The reflected portion of the beam is directed back along a path 24. Another portion of the beam passes through the disc and is intercepted by the surface 18 of the magnetic head 16. This portion of the beam in turn is reflected back through the disc 10 along a path 26. It will be seen that since the incident beam is reflected off the two surfaces, the two reflected beams 24 and 26 will be at an angle to each other which is twice the angle $\alpha$ between the two reflecting surfaces. A screen 28 is positioned at a distance R from the flying head which intercepts the reflected beams 24 and 26. The screen, as shown in FIG. 2, is provided with a linear scale which can be calibrated directly in minutes of arc if the distance $R$ is fixed. For small angles $\alpha$, the relationship between the displacement of the two reflected beams 24 and 26 where they intercept the screen 28 is given very nearly by the equation $D = 2R\alpha$ where $\alpha$ is the angle between the two beams and $R$ is the distance between the screen and apparent source of the two beams. Since the distance between the surface of the disc and the apparent source of the two reflected beams is extremely small relative to the distance from the screen to the disc, $R$ is effectively determined by measuring the distance from the disc to the screen. Typically, $R$ is the order of 50 feet so that the displacement distance on the screen for typical angles of $\alpha$ would be a few inches. Thus an extremely accurate measurement of very small angles between the disc surface and the surface of the flying head can be determined by this arrangement.

By directing the narrow laser beam 22 in a direction such that a portion of the beam is reflected off the surface 18 of the flying head and a portion of the beam is reflected off the front surface 21 of the flying head, the front surface forms a second reflected beam 30. This second beam will intercept the screen at a displacement of $2R\,\theta$ from the first reflected beam 26, where $\theta$ is the acute angle formed between the plane of the surface 18 and the plane of the surface 21. Thus the same arrangement can provide an accurate determination of the relative angle between the two surfaces of the flying head.

To reduce the space which the angle measuring system may require, additional mirrors may be used to fold the distance $R$ up into a number of shorter lengths. For example, a pair of parallel mirror surfaces positioned as indicated by the dotted lines 32 and 34 can be used to reduce the overall distance required between the screen and the flying head without reducing the effective value of $R$. A single laser beam may be used to test the angle of a plurality of flying heads employed in a single magnetic disc recorder by moving the laser beam to direct the beam at different magnetic heads, or by utilizing conventional optical means such as mirrors or prisms to shift the angle of incidence from the laser source so as to direct the beam towards any selected one of the plurality of flying heads.

In order to reduce jitter in the reflected image, it may be desirable to provide an opaque mask as indicated at 36, on the glass disc with only a small window 38 provided at one point on the disc where the incident beam can pass through to the flying head and be reflected back to the screen. While this has a chopping effect on the reflected beam, the speed of rotation of the disc is such that the reflected image remains clearly visible on the screen.

What is claimed is:

1. The method of measuring the flying angle between a rotating recording disc and a magnetic head held in spaced relation to the disc by a cushion of air, the method comprising the steps of: rotating the disc past the head to form an air cushion between the disc and the head, directing a collimated incident beam of light toward the disc at a point adjacent the head, a portion of the beam passing through the disc and striking the adjacent air cushion forming surface of the head, forming separate images of the light reflected from the surface of the disc and reflected from the surface of the head at the same light path distance from the disc, and measuring the separation between the images.

2. The method of claim 1 wherein said separate images are formed in synchronism with the rotation of the disc during a small fraction of each revolution of the disc.

3. Apparatus for measuring the flying angle of a magnetic head relative to a rotating recording disc where the head has a flat surface forming an air bearing with the disc surface, comprising a disc made of transparent material, a source of a collimated light beam, means directing the light beam from the source through the transparent disc toward said flat surface of the head adjacent the disc at a small angle of incidence from the normal relation to the surface of the disc, a portion of the beam being reflected by the disc along a first angle of reflection, a portion of the beam being reflected by the surface of the head at a second angle of reflection, a screen positioned a known distance from the adjacent surfaces of the head and disc, the distance being very large relative to the spacing between the disc and said surface of the head, and means directing the two reflected portions of the beam at the screen to form spaced images from the reflected beam portions on the screen, the distance between the images being a direct measure of the angle between the surface of the head and the surface of the disc.

4. The apparatus of claim 3 wherein the source of the collimated light beam is a laser.

5. The apparatus of claim 3 further including a mask between the light source and the disc, the mask having an opening therein for passing the light beam from the source to the magnetic head, the mask rotating with the disc.

* * * * *